Patented Mar. 7, 1950

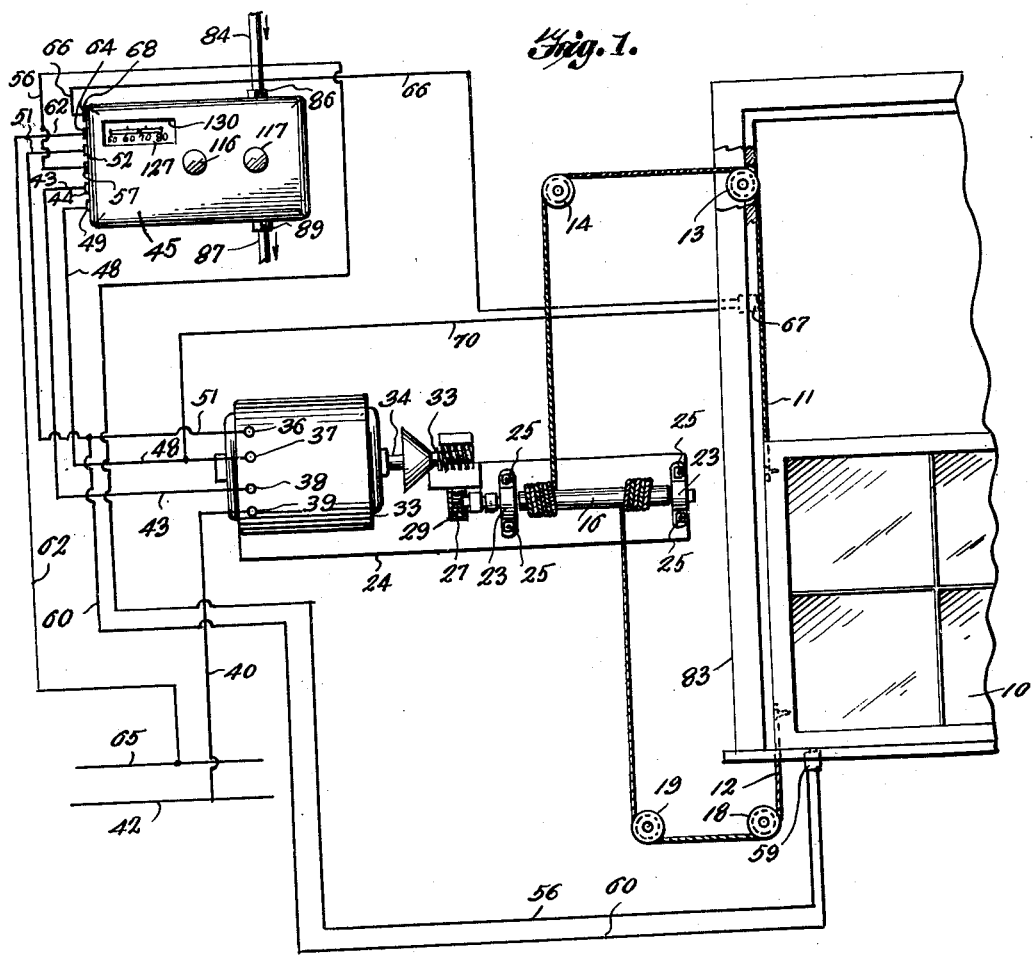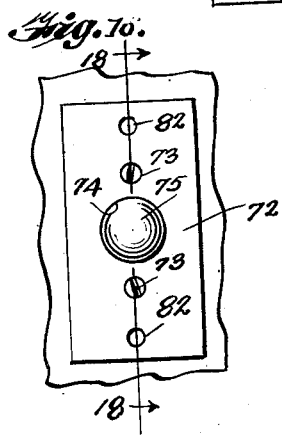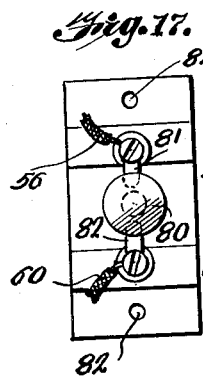

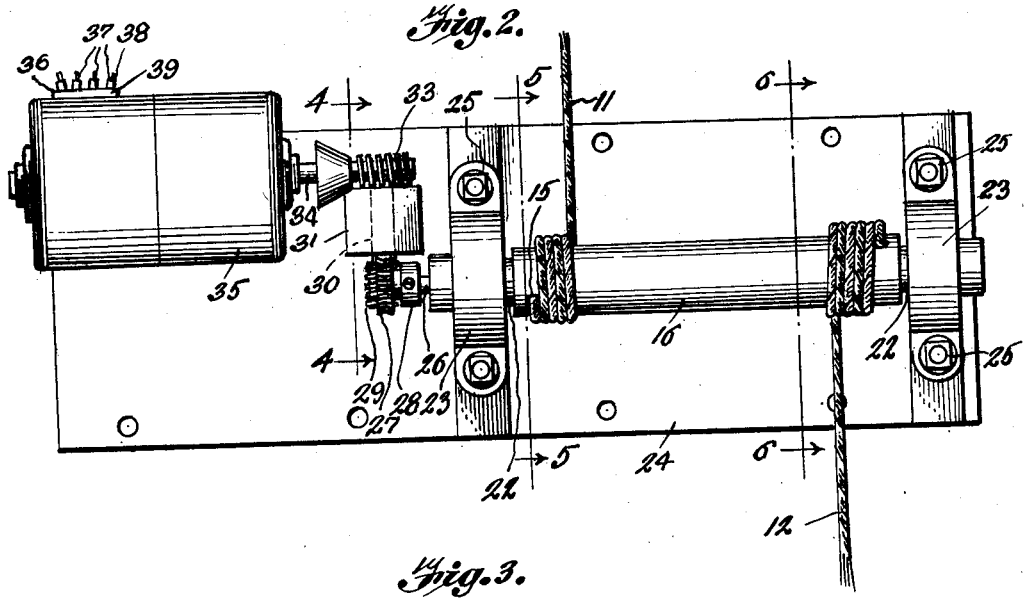
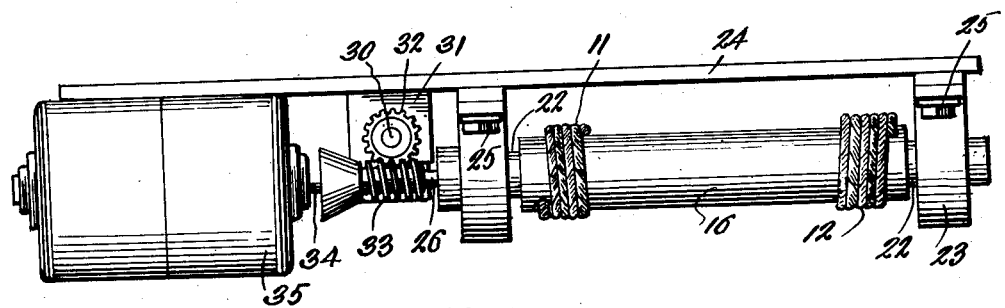
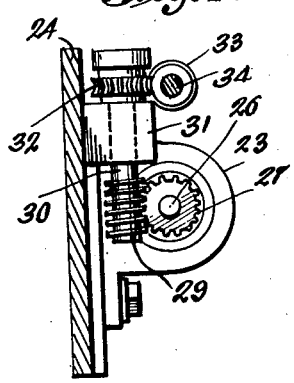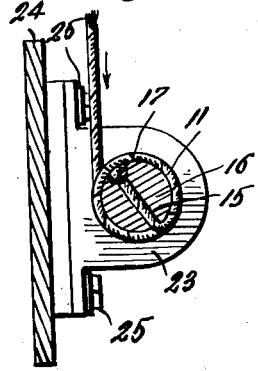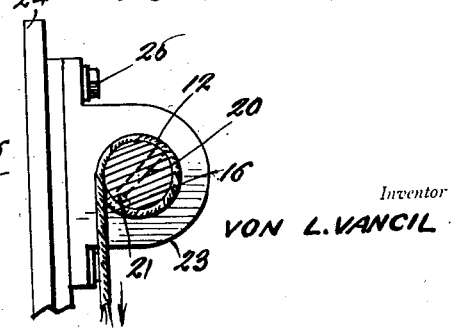

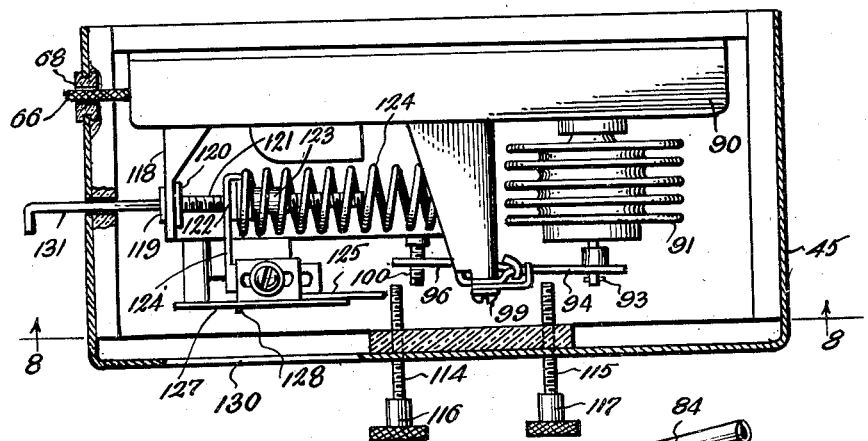
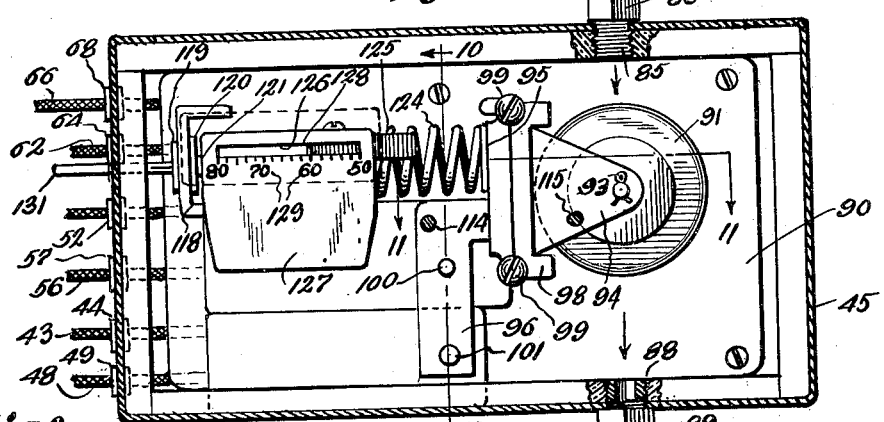
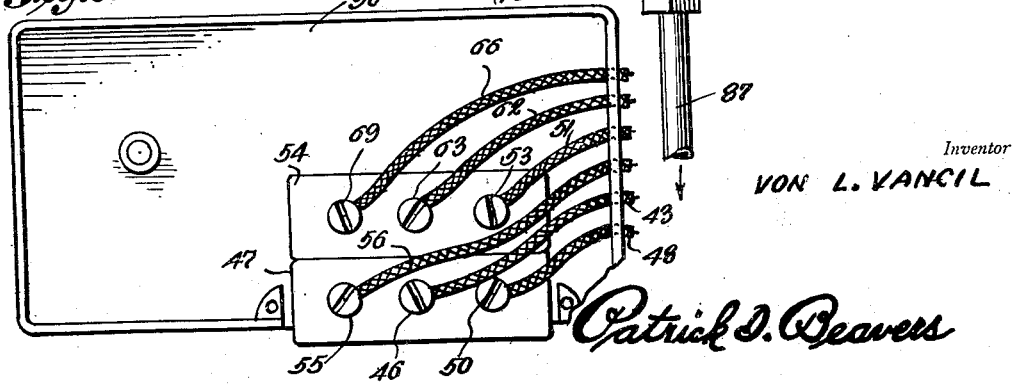

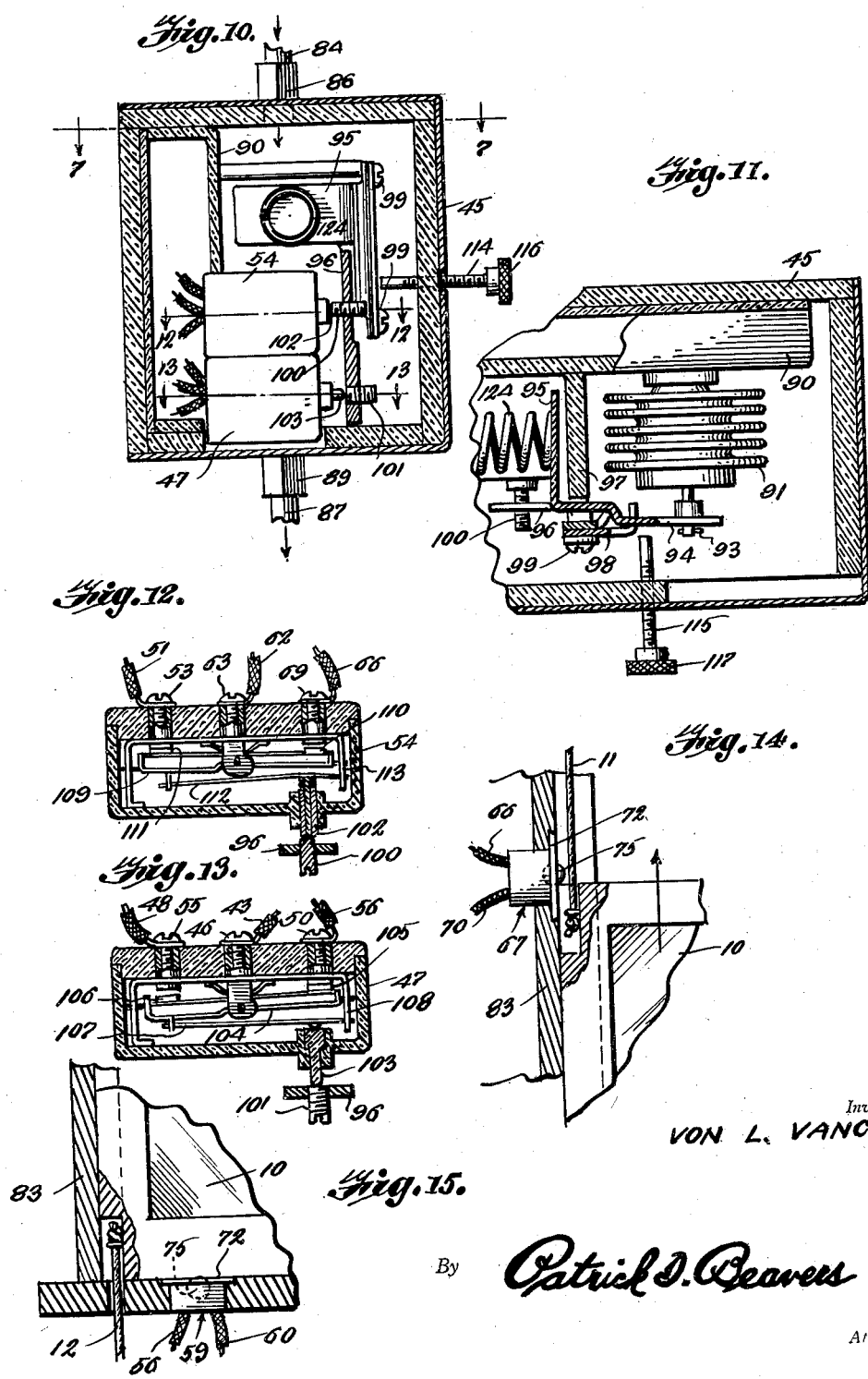

2,499,544

UNITED STATES PATENT OFFICE 2,499,544

WINDOW OPERATOR WITH A COMBINED TEMPERATURE AND RAIN RESPONSIVE CONTROL

Von L. Vancil, Freeport, Tex.

Application May 7, 1948, Serial No. 25,607

3 Claims. (Cl. 268—123)

The present invention relates to window sash control systems and it consists in the combinations, constructions and arragements of parts herein described and claimed.

It is an object of the present invention to provide an apparatus having automatic means for closing a window while it is raining and having further automatic means for opening the same under certain predetermined temperature conditions upon the cessation of rain.

Another object of the invention is the provision of means for manually controlling the apparatus above referred to independently of the automatic means.

Another object of the invention is the provision of automatic temperature controlled means for opening and closing a window.

Another object of the invention is the provision of means associated with the automatic temperature controlled means for providing a differential in the temperature at which the window opening means is operated and the temperature at which the window closing means is operated.

A further object of the invention is the provision of manually operated means for regulating the temperatures and the differentials in temperatures at which the apparatus will automatically function.

Another object of the invention is the provision of novel rain-operated means and apparatus for opening and closing windows.

Another object of the invention is the provision of novel electrical switches forming a part of the invention.

A further object of the invention is the provision of novel motor-operated means and apparatus connected with the sash cords of a window for moving the window.

Other and further objects of the invention will become apparent from a reading of the following specification taken in conjunction with the drawings, in which:

Figure 1 is a schematic view, partly in elevation, illustrating an electrical and mechanical system forming an embodiment of the invention, Figure 2 is a plan view of a portion of the invention, Figure 3 is a side elevational view of the apparatus shown in Figure 2, Figure 4 is a sectional view taken along line 4—4 of Figure 2, Figure 5 is a sectional view taken along line 5—5 of Figure 2, Figure 6 is a sectional view taken along line 6—6 of Figure 2, Figure 7 is a sectional view taken along line 7—7 of Figure 10, Figure 8 is a sectional view taken along line 8—8 of Figure 7, Figure 9 is a fragmentary rear elevational view of the apparatus shown in Figures 7 and 8, Figure 10 is a sectional view taken along line 10—10 of Figure 8, Figure 11 is a fragmentary sectional view taken along line 11—11 of Figure 8, Figure 12 is an enlarged sectional view taken along line 12—12 of Figure 10, Figure 13 is an enlarged sectional view taken along line 13—13 of Figure 10, Figures 14 and 15 are fragmentary sectional views, partly in elevation, illustrating certain details of construction.

Figure 16 is a fragmentary front elevational view of a switch forming a part of the invention, Figure 17 is a rear elevational view of the device shown in Figure 16, and Figure 18 is a sectional view taken along line 18—18 of Figure 16.

Generally there is provided an apparatus for automatically opening and closing windows under certain conditions of temperatures and precipitation. A reversible electric motor is provided which is connected by gearing to a drum upon which an upper and a lower sash cord are oppositely wound. A thermostatically operated electrical switch mechanism is provided to cause the motor to lift the window at a certain temperature and to lower the window at a certain different temperature. Means is provided for manually regulating and determining such temperatures for providing a selected differential between the two temperatures. Associated with the thermostatic switches is a bellows acted upon by precipitation to cause the motor to close the window and automatic means is provided for normal automatic temperature-controlled operation of the window when there is no precipitation. A manually controlled switch is also provided for operating the motor in either direction regardless of temperature or precipitation conditions, if desired.

Referring more particularly to the drawings, there is shown therein a window 10 having an upper sash cord 11 affixed to one side adjacent the upper end thereof and a lower sash cord 12 affixed to the same side of the window at the lower end thereof. The cord 11 is trained over guide rollers 13 and 14 and thence through a transverse passage 15 adjacent one end of a drum 16 and terminates in a knot 17. The cord 12 is trained over guide rollers 18 and 19 and thence through a transverse passage 20 adjacent the opposite end of the roller 16 to that adjacent the passage 15 and terminates in a knot 21.

The drum 16 is provided with an axle member 22 at either end, which members are revolubly mounted in journals 23 removably affixed to a base board 24 by means of bolts 25 or the like.

To one of the axle members 22 is affixed a shaft 26 having a worm gear 27 mounted thereon by means of a collar 28. The gear 27 is enmeshed with a worm screw 29 formed at one end of a shaft 30 journaled in a block 31 mounted on the base board 24. The other end of the shaft 30 is provided with a worm gear 32 which is enmeshed, in turn, with a worm screw 33 carried by a shaft 34 of a reversible electric motor 35 also mounted upon the base board 24. The motor is provided with four contacts 36, 37, 38 and 39.

The contact 39 is connected by a wire 40 to a line wire 41. The contact 38 is connected by a wire 43 leading through an eye 44 in one side of a control switch box 45 to a contact 46 in a switch housing 47. The contact 37 is connected by a wire 48 leading through an eye 49 in the box 45 to a contact 50 in the housing 47. The contact 36 is connected by a wire 51 leading through an eye 52 in the box 45 to a contact 53 in a housing 54 which is superposed upon the housing 47.

A contact 55 in the housing 47 is connected by a wire 56 through an eye 57 in the box 45 to one contact 58 of a limit switch 59 and a wire 60 interconnects the wire 51 with the other contact 61 of the limit switch 59.

A wire 62 interconnects a contact 63 in the housing 54 through an eye 64 in the box 45 with a lead wire 65. It is to be understood that the lead wires 42 and 65 connect with a source of electrical energy (not shown).

A wire 66 interconnects a limit switch 67 through an eye 68 in the box 45 with a contact 69 in the housing 54. The limit switch 67 is also connected by a wire 70 to the wire 48 and it is to be understood that the switches 59 and 67 are identical in structure and reference may be had to Figures 16 to 18, inclusive, for the structure of either switch, which comprises a body 71 of dielectric material to which is fastened a cover plate 72 by means of screws 73. The plate 72 is provided with a centrally disposed opening 74 through which a ball 75 partially protrudes due to the action of a follower 76 which is urged by a spring 77 surrounding a shaft 78 of the follower and confined in an opening 79 in the body 71. The free end of the shaft 78 is provided with a transversely extending contact arm 80 which is in normal contact with inwardly extending arms 81 carried by the contacts 58 and 61, respectively. The plate 72 is provided with openings 82 for fastening the limit switch in position. The limit switch 59 is placed in the lower part of the frame 83 of the window 10 whereby the lower end of the window sash may come into contact with the ball 75 when the window is in closed, or lowered, position. The limit switch 67 is positioned in the upper side of the frame 83 when the side of the window sash may come into contact with the ball 75 thereof when the sash is in open, or raised, position.

The top of the box has an inlet pipe connected with a fitting 85 by means of a coupling 86. The inlet pipe leads from the rain gutter (not shown) of the building in which the window 10 is located. A drain pipe 87 is connected with a fitting 88 in the bottom of the box 45 by means of a coupling 89.

Affixed to a standard 90 at the rear of the box 45 and directly between the fittings 85 and 88 is a bellows 91 which is provided with a centrally disposed pin 92 at its free end which pin is connected by means of a cotter pin 93 or the like to one arm 94 of a bell-crank lever having its other arm divided into an inwardly extending portion 95 and a downwardly extending portion 96. The bell crank lever is pivotally mounted on the forward face of a forwardly extending wall 97 formed integrally with the standard 90 and a plate 97 which holds the same in position by means of screws 99.

The portion 96 has threaded therethrough an upper set screw 100 and a lower set screw 101 which set screws, upon expansion of the bellows 91 are adapted to press against pins 102 and 103, respectively, which pins are respectively slidably mounted in the housings 54 and 47.

In the housing 47 is a three contact reversing switch comprising the contact 46 to the inner end of which is pivoted a rocker arm 104 having contact members 105 and 106 adjacent its outer ends and which are adapted to alternatively contact with the inner ends of contacts 50 and 55, respectively. A spring 107 interconnects one side of the rocker arm 104 and a bracket 108 to normally hold the contact member 105 against the inner end of the contact 50. Depression of the pin 103 will cause the rocker arm to revolve upon its pivot thereby breaking the contact between the member 105 and the inner end of the contact 50 and make contact between the member 106 and the inner end of the contact 55.

In the housing 54 is a three contact switch comprising the contact 63 to the inner end of which is pivotally connected a rocker arm 109 having contact members 110 and 111 adjacent its outer ends and which are adapted to alternatively contact the inner ends of contacts 69 and 53, respectively. A spring 112 interconnects one side of the rocker arm and a bracket 113 mounted in the housing 54. Depression of the pin 102 will cause the rocker arm 109 to rotate upon its pivot and open the contact between the member 110 and the inner end of contact 69 and make contact between the member 111 and the inner end of contact 53.

Screws 114 and 115 provided with knobs 116 and 117, respectively, are threaded into the front of the box 45 and the inner ends thereof are adapted to contact the portion 96 and the arm 94, respectively, of the bell crank lever.

Revolubly mounted in a bracket 118 by means of collars 119 and 120 is a threaded shaft 121 upon which is threadably engaged a detent 122 provided with a collar 123 surrounding which is a spring 124 which bears against the detent 122 and the portion 95 of the bell crank lever.

The detent 122 is provided with a forwardly extending arm 124' carrying an index plate 125 adjacent an opening 126 in an indicia bearing plate 127. The plate 125 has an indicator 128 which protrudes through the opening 126 whereby indicia 129 upon the plate 127 may be exactly indicated and the box 45 is provided with an opening 130 for viewing the plate 127 and its attendant mechanisms.

In operation, it will be apparent that the apparatus will act to automatically close the window whenever it starts to rain and automatically reopen the same when the rain ceases provided the inside temperature is above that desired and preselected by manipulating the Allen wrench 131.

To illustrate the operation more clearly, let it be assumed that the day is clear and that the thermostat has been at 76° F. with a 4° differential, that is to say, the window is to rise when the room temperature reaches 76° F. and to close when the room temperature drops to 72° F. Again, let us assume that the outside temperature is 74° F. and that there are no heating units in service in the building. Then let us assume that the temperature rises. When the temperature within the building reaches 76° F., the bellows 91 will expand causing the portion 96 to move inwardly bringing the set screws 100 and 101 into physical contact with the pins 102 and 103, respectively, thereby closing a circuit between wires 51 and 62 within the housing 54 and between wires 43 and 48 in the housing 47. When this occurs, the motor 35 will run in a counterclockwise movement of the drum 16 thereby to wind the cable 11 thereon while at the same time allowing the cable 12 to pay out from the drum 16. This will cause the window 10 to move upwardly. As the window starts to rise the limit switch 59 will close a circuit between wires 60 and 56 but this will have no effect upon the running of the motor. The window will continue to rise until the sash comes into contact with the ball 75 in limit switch 67 which causes a circuit between wires 66 and 70 to be broken, thereby causing the motor to stop running. The window will now remain in open position.

Now let it be assumed that rain begins to fall while the temperature is still above 76° F. The rain will run from the roof and collect in gutters whence it is led by gravity through the inlet pipe 84 whereupon it will fall upon the bellows 91 and thence it will discharge through the drain pipe 87. The rain water falling upon the bellows, being cooler than the air temperature, will cause the bellows to contact thus causing the arm 94 to move inwardly and consequently the portion 96 with its set screws 100 and 101 to move outwardly. This action allows the springs 112 and 107 to force the pins 102 and 103 outwardly of the housings 54 and 47, respectively, thus causing an opening of the circuit between wires 51 and 62 and the closing of a circuit between wires 62 and 66 while at the same time causing an opening of the circuit between wires 43 and 48 while closing a circuit between wires 43 and 56. This action causes the motor to run in a clockwise direction, as viewed in Figure 1, thereby causing the drum 16 to likewise rotate in a clockwise direction and to wind the cord 12 upon itself while allowing the cord 11 to pay out. Thus this causes the window 10 to close. As the window starts its downward movement the limit switch 67 closes a circuit between wires 66 and 70 which does not affect the running of the motor. When the window sash comes into contact with the ball 75 of the limit switch 59, the circuit between wires 56 and 60 is opened causing the motor to stop running. So long as rain continues to fall and rain water is passed over the bellows 91, the window will remain closed.

If the rain then ceases and the inside temperature again reaches 76° F., the window will be raised as heretofore described. However, let it be assumed that while the rain occurred the inside temperature descended to 73° F. In such case the window would remain closed as the bellows would not expand sufficiently to move the portion 96 whereby to actuate the three way switches in the housings 54 and 47.

To open or close the window without regard to temperature conditions or rain, the knobs 116 and 117 may be manipulated to press against either the arm 94 or the portion 96. Normally, however, both shafts 114 and 115 are screwed to outward positions so as not to interfere with the automatic operation of the thermostat.

The differential between opening temperature and closing temperature may be regulated by manipulating the set screws 100 and 101 and the operating temperature may be regulated by the Allen wrench 131. The operating temperature is indicated upon the plate 127 by the indicator 128 through the opening 130 in the box 45.

While but one form of the invention has been shown and described herein, it will be readily apparent to those skilled in the art that many minor modifications may be made without departing from the spirit of the invention or the scope of the appended claims.

What is claimed is:

1. An apparatus of the character described comprising, in combination, a window, a reversible electric motor for opening and closing the window, a source of electrical energy, switches for selectively applying said energy to the motor to operate the same in a forward and in a reverse direction, a bellows type thermostat for controlling said switches, and a precipitation carrying pipe having its discharge end immediately above the bellows of the thermostat.

2. An apparatus of the character described comprising, in combination, a window, a reversible electric motor for opening and closing the window, a source of electrical energy, switches for selectively applying said energy to the motor to operate the same in a forward and in a reverse direction, a bellows type thermostat for controlling said switches, limit switches associated with the window for cutting off the supply of electrical energy when the window has been moved a sufficient distance, and precipitation controlled means for independently operating the thermostat, said means including a precipitation carrying pipe having its discharge end immediately above the bellows of the thermostat.

3. An apparatus of the character described comprising, in combination, a window, a reversible electric motor for raising and lowering said window, a source of electrical energy, a first electrical circuit including said motor and source of electrical energy and adapted to move the motor in a direction to open the window, a switch for opening and closing said first circuit, a second electrical circuit including said motor and source of energy and adapted to move the motor in a direction to close the window, a switch for opening and closing said second circuit, a thermostat including a bellows for selectively operating said switches, and precipitation controlled means for closing the second electrical circuit, said means including a precipitation carrying pipe having its discharge end immediately above said bellows.

VON L. VANCIL.

REFERENCES CITED

The following references are of record in the file of this patent:

UNITED STATES PATENTS

| Number | Name | Date |
|---|---|---|
| 918,163 | Kemp | Apr. 13, 1909 |
| 1,124,969 | Stockwell | Jan. 12, 1915 |
| 1,551,512 | Goff | Aug. 25, 1925 |
| 1,554,674 | Herod | Sept. 22, 1925 |